May 4, 1943.                B. S. CALVERT                2,318,054
                            SPLICE FOR JOINTS
                            Filed May 17, 1941
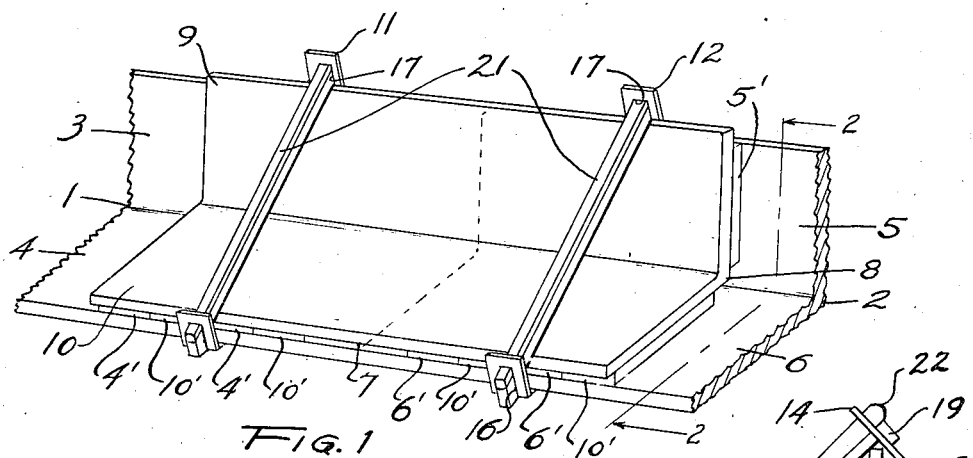
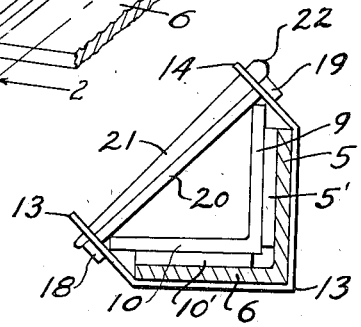
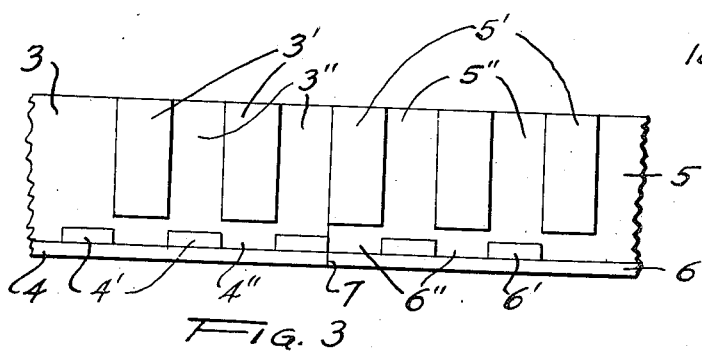
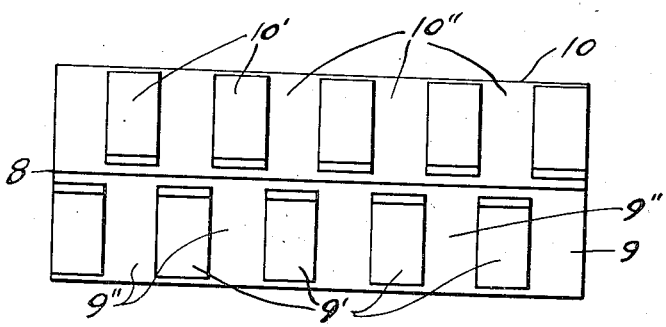
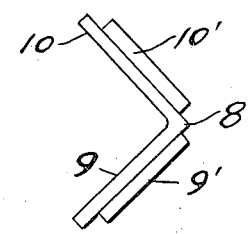
INVENTOR.
BERT S. CALVERT
BY Earl E. Moore
ATTY.

Patented May 4, 1943

2,318,054

UNITED STATES PATENT OFFICE 2,318,054

SPLICE FOR JOINTS

Bert S. Calvert, Los Angeles, Calif.

Application May 17, 1941, Serial No. 393,894

2 Claims. (Cl. 189—36)

This invention relates to means for rigidly joining together two or more posts, bars, piles, poles, pillars, struts, booms and the like, whether they are under tension or compression. Although the splice may be made permanent, if desired, it is a feature of this invention that the splice can be easily and quickly dismantled; so that structural members can be safely extended and rigidly held in place by removable elements which form the splice.

The structural elements to be joined together, have their ends abut one another; a third rigid element overlaps the joint and is securely clamped to the structural elements. Splines are then provided near the joint ends of the structural elements and also on the third element; the splines of all the elements interlocking so that the joint is just as strong or stronger in tension and compression as the structural elements themselves.

An object of this invention is to provide rigid economical joints for structural elements which may be permanent, or temporary for easy and quick dismantling.

Other objects, advantages and features of my invention will appear from the accompanying drawing, the subjoined detailed description, the preamble of these specifications and the appended claims.

Applicant is about to illustrate and describe one of the forms of his invention in order to teach one how to make, use and vend the same, but it is to be understood that the drawing and description thereof are not to limit the invention in any sense whatsoever, except as limited by the appended claims.

In the drawing:

Fig. 1 is a perspective view of a form of the invention.

Fig. 2 is a cross sectional view taken substantially along the line 2—2 of Fig. 1.

Fig. 3 is an elevational view of a portion of Fig. 1.

Fig. 4 is a rear elevational view of one of the parts shown in Figs. 1 and 2.

Fig. 5 is an end elevational view of Fig. 4.

The form of the invention as illustrated, shows two angle irons or structural elements 1 and 2 which are to be joined together so that one is the continuation of the other. The elements 1 and 2 have the integral flanges 3 and 4, and 5 and 6 respectively. The near or adjacent ends of the elements abut one another at 7 which is lapped over by a lap angle iron 8. This lap angle iron has integral flanges 9 and 10 and they have sufficient length to extend well along the structural elements 1 and 2.

The flanges 4 and 6 are provided with a plurality of bars, splines, or keys 4' and 6' respectively fixed thereto, the bars 4' being spaced apart to provide a plurality of keyways or recesses 4" and the bars 6' being spaced apart to provide the keyways or recesses 6". The flanges 3 and 5 have a plurality of bars 3' and 5' respectively fixed thereto which are spaced apart to provide the recesses 3" and 5".

The back side of the lap iron 8 has its flanges 9 and 10 provided with a plurality of bars 9' and 10' respectively, the bars 9' being spaced apart to provide the recesses 9" and the bars 10' being spaced apart to provide the recesses 10".

All the bars and recesses of all the elements and members are of the same size so that the bars can be fitted snugly into their respective recesses in accordance to the objects of the invention. Obviously, all the bars are welded or otherwise securely held to their respective flanges so that when the lap iron is placed across the joint of the two structural elements 1 and 2, the bars of the lap iron will fit into the spaces or recesses of the structural elements as shown in Fig. 1. The staggered relation of the bars on their respective elements provides a very strong joint when all are fixed together, in fact, a joint is formed that is stronger in shear, tension and compression than any part of the individual elements.

The lap angle iron is held to the structural elements by clamps 11 and 12, or more clamps if desired. Each clamp comprises a heavy strap 13, note Fig. 2, which is bent as shown to follow the contour of the outside surface of the angle elements. The ends of the straps 13 terminate in ears 14 and 15 which have slots 16 and 17 respectively. These slots are large enough to receive the vent ends 18 and 19 of the clamp rod 20. These rod ends extend beyond the slots and adjacent the sides of the ears 13 and 14 so that the rod will not slip from its position with respect to the clamp ears. An elongated wedge 21 is forced through the slots and rests upon the rod 20 and securely holds same in place. This wedge 21 is preferably a long tapered stem having a rectangular cross section. Any suitably arranged means, such as a set-screw, may be employed to hold the wedge in place, but this does not seem to be necessary when the wedge 21 is driven into place by striking the end 22 thereof with a heavy hammer.

In accordance with the foregoing, a very strong and dependable joint of structural elements has been presented, a joint that can be assembled easily and quickly and disassociated with ease by unskilled workmen.

Having thus described my invention, what is claimed as new and desired to be secured by Letters Patent is:

1. A structural joint comprising a plurality of angle irons pressed together by a holding means, spaced apart splines fixed to adjacent faces of the irons and nested snugly together to form a joint having uniform thickness, said holding means comprising a strap formed to agree with the external contour of the joint and having ears extending beyond the joint, openings in the ears, a clamp-rod in the openings having ends turned parallel with and abutting the said ears, said clamp-rod abutting the edges of one of the angle irons, and a wedge bar in the openings for locking the strap to the joint in the manner described.

2. An angle iron joint comprising a plurality of angle irons nested together in a tight fit by a holding means, spaced apart splines fixed to adjacent faces of the irons and intermeshed to prevent longitudinal displacement of the irons, said holding means comprising a strap configurated to agree with the outer contour of the nested irons, the means having ears with openings extending beyond the joint, a clamp-rod passing through the openings and engaging the free edges of at least one of the irons, and means at the ends of the clamp-rod for engaging outer sides of the ears, a wedge bar passing through the openings superimposed on the clamp-rod for locking the strap snugly to the joint.

BERT S. CALVERT.